(12) United States Patent
Lin et al.

(10) Patent No.: US 7,176,393 B1
(45) Date of Patent: Feb. 13, 2007

(54) MOUNTING APPARATUS FOR KEYBOARD OF PORTABLE COMPUTER

(75) Inventors: Ke-Cheng Lin, Tu-Cheng (TW);
Wen-Kang Lo, Tu-Cheng (TW);
Chien-Li Tsai, Tu-Cheng (TW)

(73) Assignee: Hon Hai Precision Industry Co. Ltd., Taipei Hsien (TW)

( * ) Notice: Subject to any disclaimer, the term of this patent is extended or adjusted under 35 U.S.C. 154(b) by 0 days.

(21) Appl. No.: 11/308,754

(22) Filed: Apr. 28, 2006

(30) Foreign Application Priority Data

Sep. 9, 2005  (CN) .................. 2005 2 0064413

(51) Int. Cl.
*H01H 9/00* (2006.01)
(52) U.S. Cl. ...................... 200/5 A; 361/680
(58) Field of Classification Search .............. 200/5 R, 200/5 A; 248/917–920; 235/472.01, 462.45, 235/462.43, 145 R; 312/215, 222, 223.2; 341/22; 345/168, 169, 170–173; 364/708.1; 400/472, 472.1, 680–682, 492, 495, 496; 361/680–683, 724, 732, 740, 747, 759
See application file for complete search history.

(56) References Cited

U.S. PATENT DOCUMENTS

| | | | |
|---|---|---|---|
| 4,564,751 A * | 1/1986 | Alley et al. ............... 235/146 |
| 5,335,141 A | 8/1994 | Hosoi | |
| 5,510,953 A * | 4/1996 | Merkel .................... 361/680 |
| 5,966,284 A | 10/1999 | Youn | |
| 6,104,604 A * | 8/2000 | Anderson et al. .......... 361/680 |
| 6,212,066 B1 * | 4/2001 | Fetterman ................ 361/680 |
| 6,320,743 B1 * | 11/2001 | Jin et al. ................. 361/680 |
| 6,493,215 B1 * | 12/2002 | Chiang et al. ............ 361/680 |
| 6,751,089 B2 | 6/2004 | Heieh | |
| 2004/0190233 A1 | 9/2004 | WeiMing | |

* cited by examiner

*Primary Examiner*—Michael A. Friedhofer
(74) *Attorney, Agent, or Firm*—Wei-Te Chung

(57) ABSTRACT

A mounting apparatus for a keyboard of a portable computer includes a keyboard, a base of a portable computer and at least one fastener. The base comprises a sunken receiving portion for accommodating the keyboard therein. A sidewall of the receiving portion forms at least one mounting portion. An underside of the base has a supporting portion corresponding to the at least one mounting portion. The at least one fastener comprises a locking projection and a pair of elastic stands and is movably fit between the at least one mounting portion and the corresponding supporting portion. The stands slidably abut the supporting portion and the locking projection extends into the receiving portion, engaging with a side of the keyboard. Thus the keyboard is secured to the receiving portion of the base.

18 Claims, 6 Drawing Sheets

MOUNTING APPARATUS FOR KEYBOARD OF PORTABLE COMPUTER

DESCRIPTION

1. Field of the Invention

The present invention relates to a mounting apparatus for a portable computer and, more particularly, to a mounting apparatus for a keyboard of a portable computer.

2. Description of Related Art

With the modularization of computers, technical problems have arisen regarding installation of motherboards, storage devices, compact disk read-only memory (CD-ROM) drives, digital video disc (DVD) drives, display screens, and keyboards for portable computers. Regarding the installation of keyboards in particular, there have been various technical solutions presented.

U.S. Pat. No. 5,335,141 discloses a portable personal computer having a removable keyboard secured to a housing with screws. The portable personal computer includes a housing having a mounting portion. A keyboard unit, received by the mounting portion of the housing, includes a planar keyboard body and a large number of keys arranged on top of the keyboard body. The keyboard body has fixing portions protruding from an underside thereof. The fixing portions are fixed to a bottom wall of the housing with screws, thus fixing the keyboard unit to the mounting portion. Typically, the screws are small, and so are difficult to handle and easily lost. If the screws are lost within the computer damage may occur.

Disclosed in U.S. Pat. No. 5,966,284 is a keyboard mounting apparatus for a portable computer that does not require screws. The keyboard mounting apparatus includes a depressed portion in a base for receiving a keyboard and an elastic member for lifting up the keyboard from the base. An indented part is formed on at least one of the sides of the keyboard, and a setting member is formed on a surface opposite the indented part, for engaging with a locking hole formed in the depressed portion. A locking member is mounted inside the base engages with the indented part. By manipulation of the elastic member a user can attach or detach a keyboard to or from the portable computer. The mounting apparatus is complicated to assemble inside the base and costly to manufacture.

What is desired, therefore, is a mounting apparatus which conveniently and firmly secures a keyboard to a portable computer that is less complicated to assemble and is low in cost.

SUMMARY OF THE INVENTION

In one preferred embodiment, a mounting apparatus for a keyboard of a portable computer includes a keyboard, a base of a portable computer, and at least one fastener. The base comprises a sunken receiving portion for accommodating the keyboard therein. A sidewall of the receiving portion forms at least one mounting portion. An underside of the base projects a supporting portion corresponding to the at least one mounting portion. The at least one fastener comprises a locking projection and a pair of elastic stands and is movably fit between the at least one mounting portion and the corresponding supporting portion. The stands slidably abut the supporting portion and the locking projection extends into the receiving portion, engaging with a side of the keyboard. Thus the keyboard is secured to the receiving portion of the base.

Other advantages and novel features will become more apparent from the following detailed description of preferred embodiments when taken in conjunction with the accompanying drawings, in which:

DETAILED DESCRIPTION OF THE INVENTION

Figure 1:
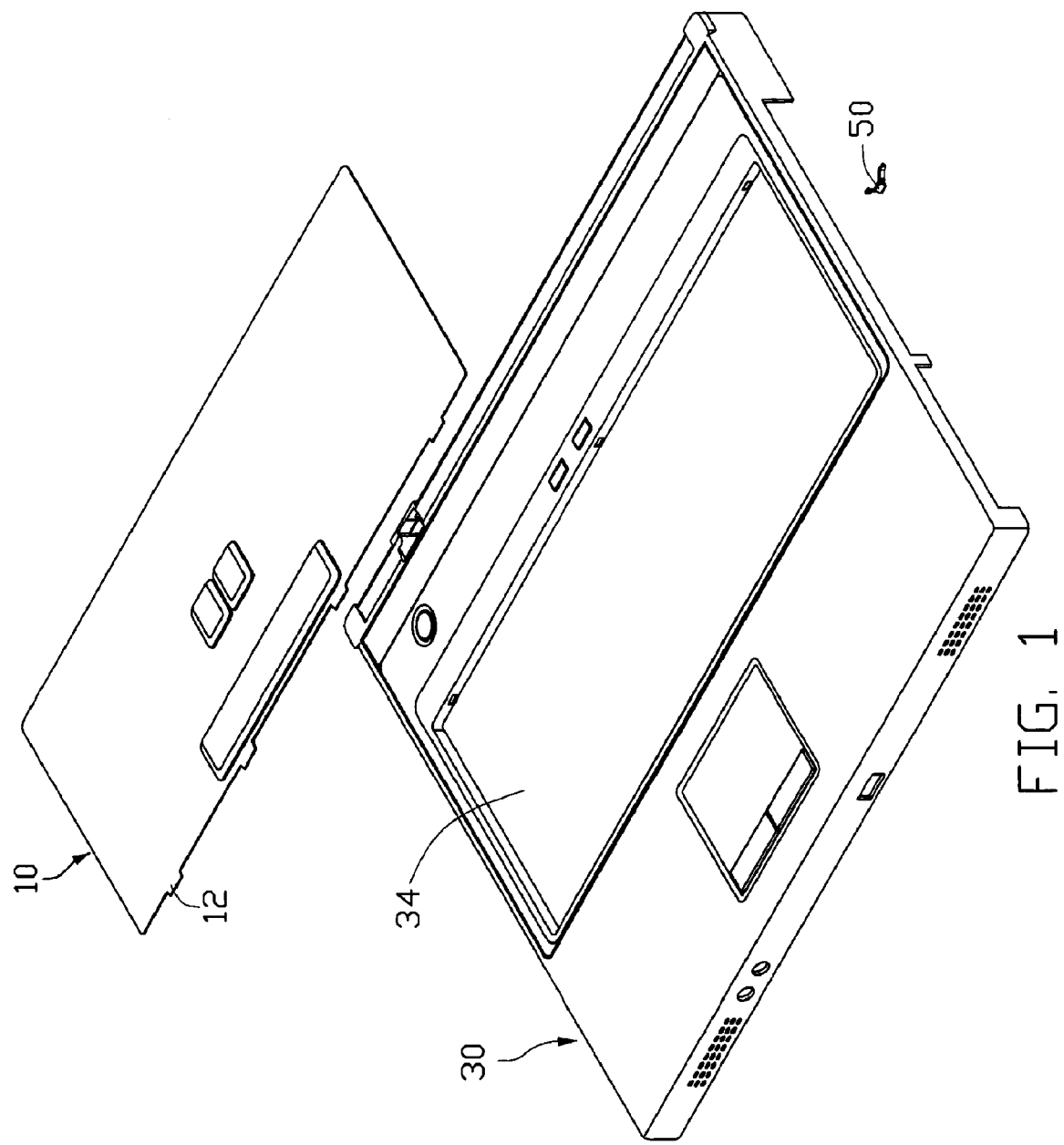
FIG. 1 is an exploded perspective view of a mounting apparatus for a keyboard of a portable computer in accordance with a preferred embodiment of the present invention.
Figure 2:
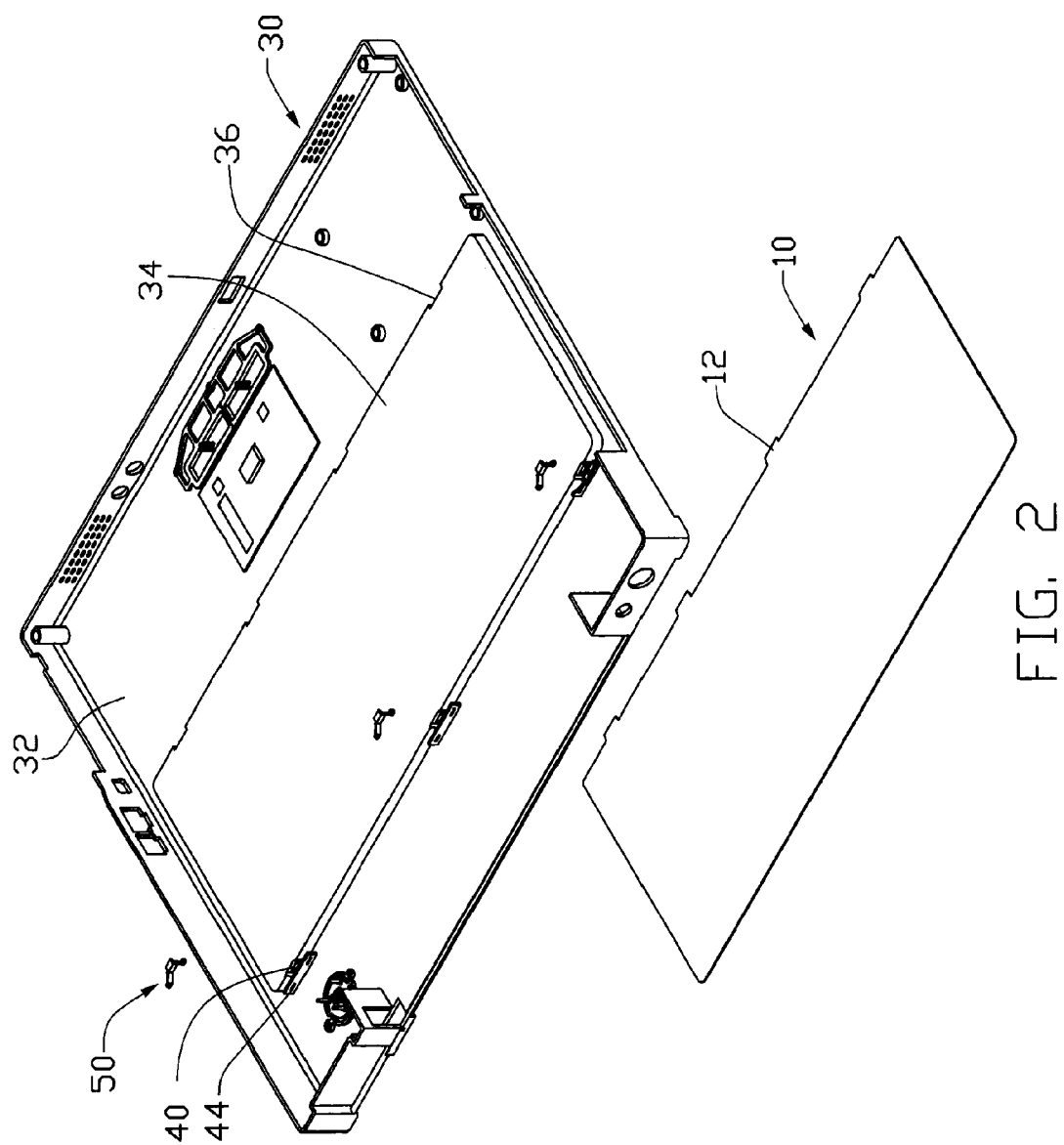
FIG. 2 is an inverted view of FIG. 1.
Figure 3:
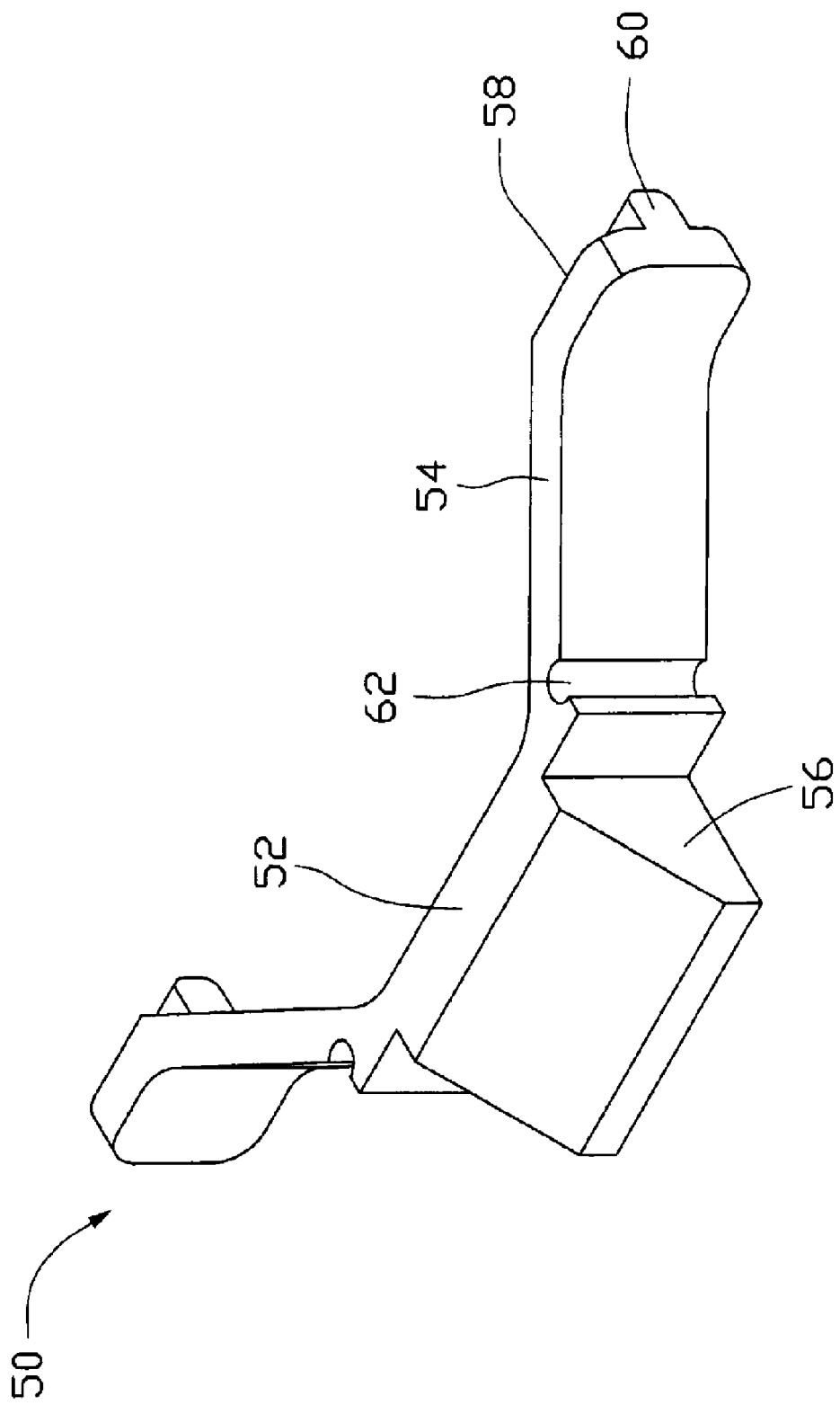
FIG. 3 is an enlarged view of a fastener of the mounting apparatus of FIG. 1.
Figure 4:
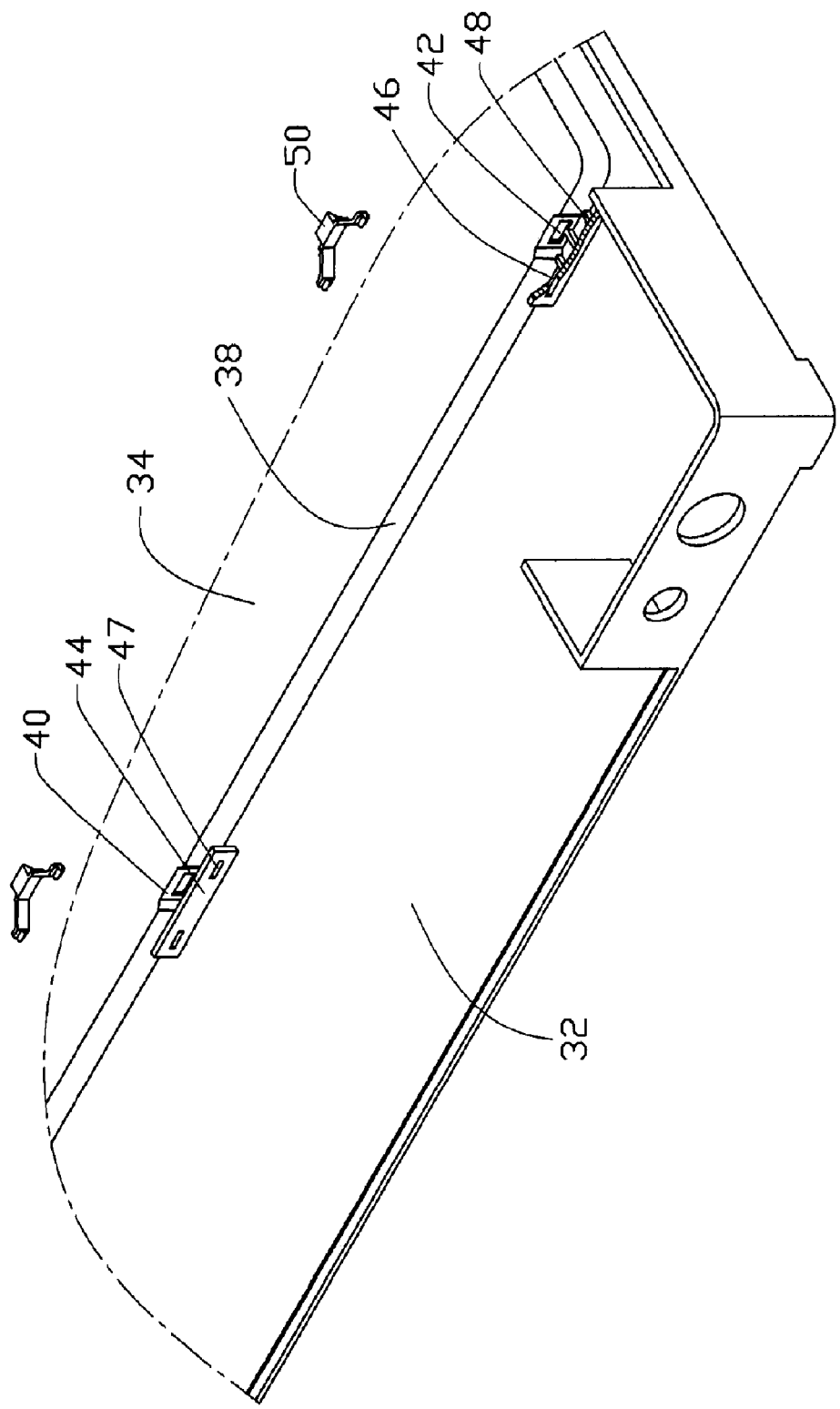
FIG. 4 is an enlarged view of two fasteners and a portion of a base of the mounting apparatus of FIG. 2, wherein a cut away view of a mounting portion is shown.

Referring to FIGS. 1–4, in a preferred embodiment of the present invention, a mounting apparatus includes a keyboard 10, a base 30 of a portable computer, and a plurality of fasteners 50.

A plurality of aligned, spaced tabs 12 projects out from a side of the keyboard 10.

The base 30 includes a top wall 32. The top wall 32 includes a sunken receiving portion 34 for accommodating the keyboard 10. A plurality of aligned, spaced slots 36 is defined in a sidewall of the receiving portion 34, corresponding to the tabs 12 of the keyboard 10. Formed on an opposite sidewall 38 of the receiving portion 34 is a plurality of aligned, spaced mounting portions 40. Each mounting portion 40 defines a through hole 42. A plurality of aligned, spaced supporting portions 44 projects down from an underside of the top wall 32, each corresponding to one of the mounting portions 40. Each supporting portion 44 and the corresponding mounting portion 40 cooperate to form a holding space 46 for accommodating one of the fasteners 50. The supporting portions 44 are perpendicular to the underside of the top wall 32 and parallel to the sidewall 38 of the receiving portion 34. Each supporting portion 44 also defines a pair of horizontal guiding grooves 47. Reinforcing ribs 48 are formed on the underside of the top wall 32 between each mounting portion 40 and the corresponding supporting portion 44.

Each fastener 50 is generally "V" shaped, and includes a main body 52 accommodated in one of the mounting portions 40 and a pair of elastic stands 54 respectively extending aslant from two ends of the main body 52. A wedge-shaped locking projection 56 extends out from the main body 52 for inserting in the through hole 42 of the corresponding mounting portion 40. A sliding surface 58 is formed on a free end of each of the stands 54. Each sliding surface 58 of the stands 54 has a horizontal sliding block 60 formed thereon. The sliding blocks 60 fit into the guiding grooves 47 of the corresponding supporting portion 44. A notch 62 is defined at a junction of each of the stands 54 and the main body 52, thus the stands 54 of the fastener 50 deform under pressure.

Figure 5:
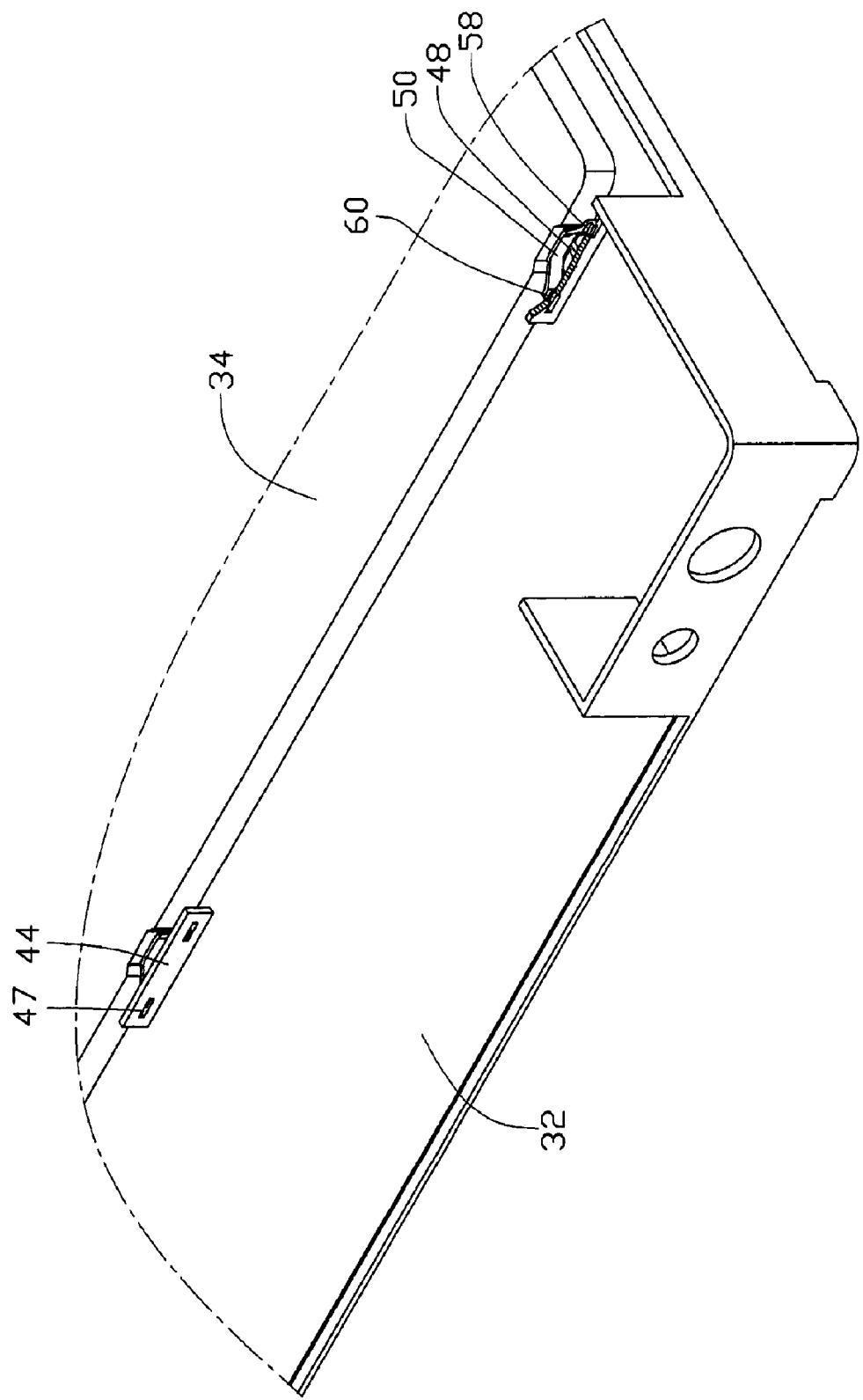
FIG. 5 is an assembled view of FIG. 4.
Figure 6:
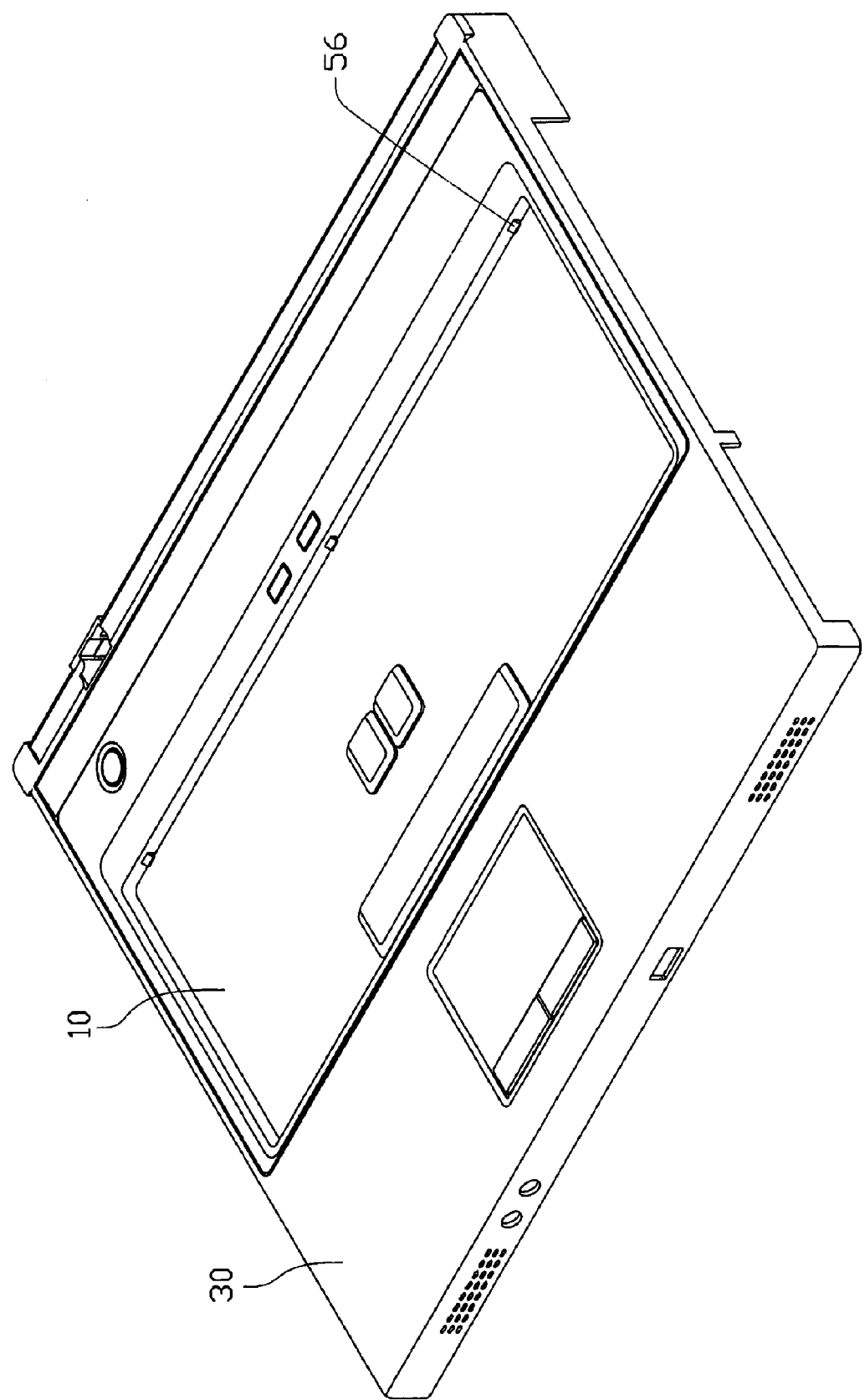
FIG. 6 is an assembled view of FIG. 1.

Referring to FIGS. 1–6, in assembly, the fasteners 50 are respectively fit into the holding spaces 46 of the top wall 32. The sliding blocks 60 of each pair of stands 54 are slidably fit into the corresponding guiding grooves 47 of the supporting portions 44. The sliding faces 58 of each pair of stands 54 abut the corresponding supporting portions 44. The main bodies 52 are accommodated in the corresponding mounting portions 40, and the locking projections 56 are inserted through the corresponding through holes 42 of the mounting portions 40 so that the locking projection 56 is able to slide in a back-and-forth direction through the through hole 42 relative to the base 30, and free ends of the stands 54 is able to slide along the supporting portion 44 in a direction perpendicular to said back-and-forth direction. Thus the fasteners 50 are secured in the base 30. The side of the keyboard 10 with the tabs 12 projecting therefrom, is fit into the receiving portion 34 ensuring alignment of the tabs 12 with, and insertion into, the corresponding slots 36 of the receiving portion 34. Then an opposite side of the keyboard 10 is pressed into the receiving portion 34 causing the locking projections 56 to be pushed back within the corresponding through holes 42 of the supporting portions 40. Once the keyboard 10 is pressed all the way into the receiving portion 34, a top edge of the keyboard 10 clears a bottom edge of the projections 56 thereby allowing an elastic response of the compressed projections 56 so that they return through the corresponding through holes 42 and project beyond the top edge of the keyboard 10 thereby trapping the keyboard 10 in the receiving portion 34. Thus, the keyboard 10 is firmly secured to the base 30.

The keyboard 10 is secured to the base 30 by only a plurality of fasteners 50. The assembly of the fasteners 50 is convenient and manufacturing costs are low. Accordingly, the mounting apparatus is convenient and cost effective.

In disassembly, the locking projections 56 of the fasteners 50 are pressed inwardly free from the opposite side of the keyboard 10. The keyboard 10 is lifted up and pulled so that the tabs 12 of the keyboard 10 are removed from the corresponding slots 36. Thus the keyboard 10 is disassembled from the base 30.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus, comprising:
   a keyboard;
   a base comprising a sunken receiving portion for accommodating the keyboard therein, a sidewall of the receiving portion forming at least one mounting portion, a supporting portion projecting from an underside of the base corresponding to the at least one mounting portion, the supporting portion defining a pair of guiding grooves; and
   at least one fastener comprising a locking projection and a pair of elastic stands, the two stands each forming a sliding block corresponding to one of the guiding grooves, the at least one fastener being movably fit between the at least one mounting portion and the supporting portion, the stands slidably abutting the supporting portion with the sliding blocks movably engaging into the corresponding guiding grooves, and the locking projection extending into the receiving portion, engaging with a side of the keyboard thereby securing the keyboard to the receiving portion of the base.

2. The mounting apparatus as claimed in claim 1, wherein the at least one mounting portion defines a through hole for the locking projection projecting therethrough.

3. The mounting apparatus as claimed in claim 1, wherein a plurality of aligned, spaced tabs projects out from an opposite side of the keyboard, and a plurality of aligned, spaced slots is defined in an opposite sidewall of the receiving portion, corresponding to the tabs.

4. The mounting apparatus as claimed in claim 1, wherein a sliding surface is formed on a free end of each of the stands, the sliding block is formed on the sliding surface.

5. The mounting apparatus as claimed in claim 1, wherein the locking projection of the at least one fastener is wedge-shaped.

6. The mounting apparatus as claimed in claim 1, wherein the at least one fastener further comprises a main body being accommodated in the at least one mounting portion, the locking projection extends out from the main body, and the stands respectively extend aslant from two ends of the main body.

7. The mounting apparatus as claimed in claim 6, wherein a notch is defined at a junction of each of the stands and the main body for facilitating deformation of the stands.

8. The mounting apparatus as claimed in claim 1, wherein reinforcing ribs are formed on the underside of the base between the at least one mounting portion and the corresponding supporting portion.

9. A mounting apparatus, comprising:
   a keyboard;
   a base comprising a sunken receiving portion for accommodating the keyboard, the underside of the base defining at least one holding space in the vicinity of the receiving portion; and
   at least one fastener being movably fit into the at least one holding space, the at least one fastener comprising a main body, a locking projection extending forward from the main body, and a pair of elastic stands respectively extending aslant rearward from two ends of the main body to form a generally V-shaped configuration together with the main body, the stands slidably abutting a supporting portion of the at least one holding space, and the locking projection extending into the receiving portion, engaging with a side of the keyboard thereby securing the keyboard to the receiving portion of the base, wherein when the locking projection slides in a back-and-forth direction relative to the base, and free ends of the stands slide along the supporting portion in a direction perpendicular to said back-and-forth direction.

10. The mounting apparatus as claimed in claim 9, wherein the at least one holding space also comprises a mounting portion formed on a sidewall of the receiving portion, the supporting portion projects down from an underside of the base, corresponding to the mounting portion.

11. The mounting apparatus as claimed in claim 10, wherein the mounting portion defines a through hole for the locking projection projecting therethrough.

12. The mounting apparatus as claimed in claim 10, wherein reinforcing ribs are formed on the underside of the base between the supporting portion and the corresponding mounting portion.

13. The mounting apparatus as claimed in claim 9, wherein a plurality of aligned, spaced tabs projects out from an opposite side of the keyboard, and a plurality of aligned, spaced slots is defined in an opposite sidewall of the receiving portion, corresponding to the tabs.

14. The mounting apparatus as claimed in claim 9, wherein a sliding surface is formed on a free end of each of the stands, a sliding block is formed on each of the sliding surfaces, the supporting portion defines a pair of guiding grooves, and the sliding blocks are slidably fit into the pair of the guiding grooves.

15. The mounting apparatus as claimed in claim 9, wherein the locking projection of the at least one fastener is wedge-shaped.

16. The mounting apparatus as claimed in claim 9, wherein a notch is defined at a junction of each of the stands and the main body for facilitating deformation of the stands.

17. A mounting apparatus, comprising:
   a keyboard;
   a base forming a sunken receiving portion for accommodating the keyboard therein, at least one sidewall of the receiving portion defining at least one through hole therethrough, a supporting portion projecting from the base aligning with the through hole and defining at least one guiding groove therein; and
   at least one fastener comprising a locking projection and a pair of elastic stands extending aslant from the locking projection, the at least one fastener being arranged between the at least one sidewall and the supporting portion with free ends of the stands slidably engaging with the at least one guiding groove and the locking projection extending through the through hole and into the receiving portion to capture an edge of the keyboard thereby trapping the keyboard in the receiving portion of the wall.

18. The mounting apparatus as claimed in claim 17, wherein two sliding blocks are respectively formed on the free ends of the stands and slidably engage in the at least guiding groove.

* * * * *